United States Patent [19]

Mabry

[11] Patent Number: 4,719,741

[45] Date of Patent: Jan. 19, 1988

[54] CROSS SEAL COOLING FOR VERTICAL FORM FILL SEAL APPARATUS

[75] Inventor: James R. Mabry, Spartanburg, S.C.

[73] Assignee: W. R. Grace & Co., Cryovac Div., Duncan, S.C.

[21] Appl. No.: 938,939

[22] Filed: Dec. 8, 1986

[51] Int. Cl.$^4$ .......................... B65B 9/08; B65B 51/30

[52] U.S. Cl. .................... 53/451; 53/551; 53/373; 53/479

[58] Field of Search .......... 53/551, 552, 554, 575, 53/479, 576, 373, 451, 463

[56] References Cited

U.S. PATENT DOCUMENTS

| | | | |
|---|---|---|---|
| 2,956,383 | 10/1960 | Gausman | 53/552 X |
| 3,340,129 | 9/1967 | Grevich | 53/552 X |
| 3,611,657 | 10/1971 | Inoue et al. | 53/551 X |
| 3,703,796 | 11/1972 | Inoue et al. | 53/551 X |
| 4,506,494 | 3/1985 | Shimoyama et al. | 53/551 |
| 4,532,753 | 8/1985 | Kovacs | 53/551 X |
| 4,589,247 | 5/1986 | Tsuruta et al. | 53/551 X |

Primary Examiner—Horace M. Culver
Attorney, Agent, or Firm—John J. Toney; William D. Lee, Jr.; Mark B. Quatt

[57] ABSTRACT

A method and apparatus for improving transverse seal strength in a vertical form-fill-seal machine includes directing a cooling medium on a just formed transverse seal from an area beneath and on either side of the film, in an arcuate pattern to effect cooling during at least a portion of the downward movement of the seal toward a cutting means.

4 Claims, 4 Drawing Figures

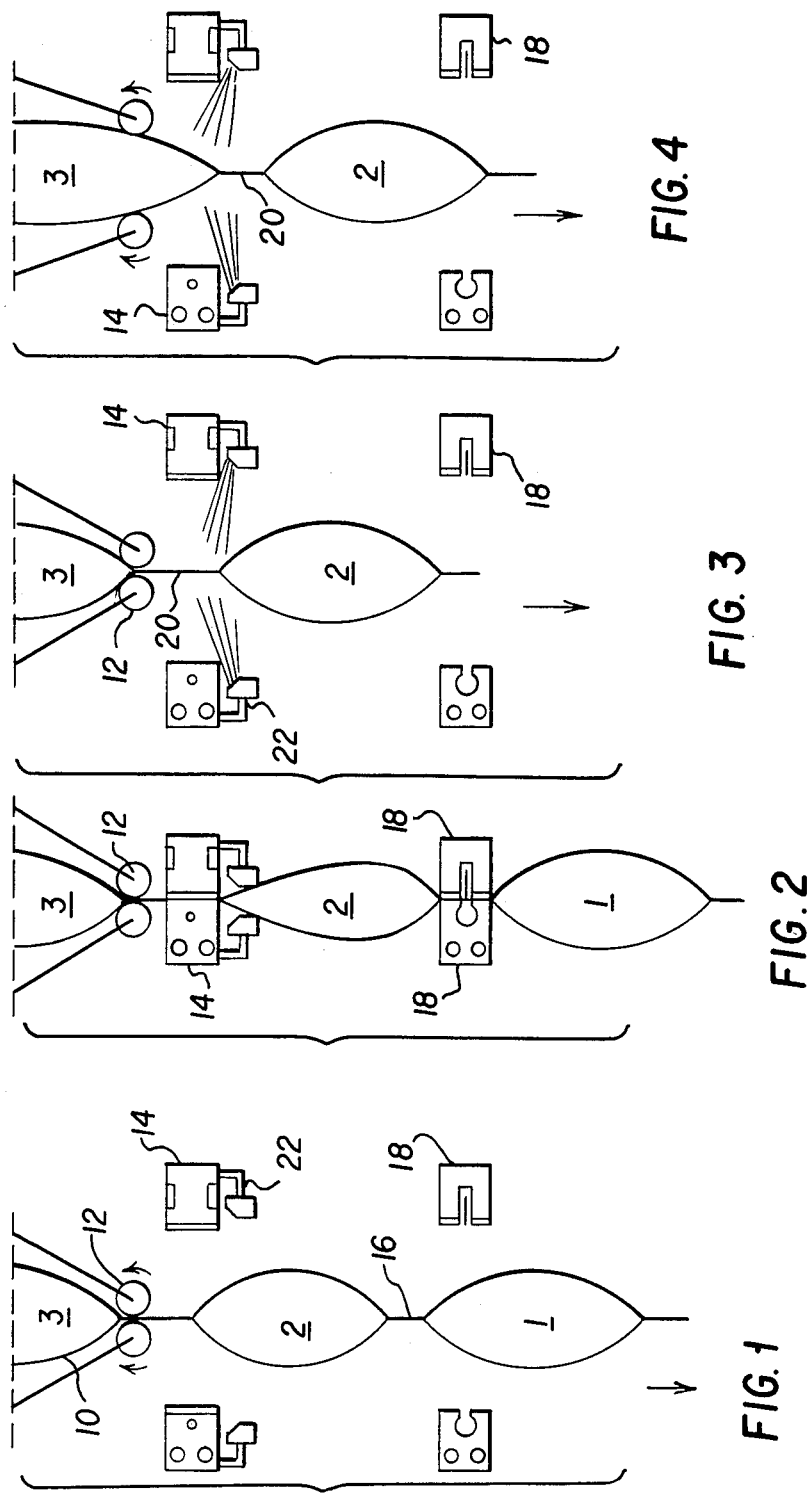

CROSS SEAL COOLING FOR VERTICAL FORM FILL SEAL APPARATUS

BACKGROUND OF THE INVENTION

The present invention relates to methods and apparatus for packaging products on a form-fill-seal system, and more particularly a method of cooling transverse seals formed on packages produced on form-fill-seal equipment.

It is well known, in packaging many goods including food items, to employ what is commonly known as form-fill-seal equipment. This equipment may be aligned in either a horizontal or vertical direction, with the flow path of rollstock film and a product to be packaged moving in essentially the same direction, either horizontally or in a downward vertical direction. In the vertical form-fill-seal arrangement, flexible packaging material is fed from a rollstock to a tube former where a tube is fashioned from the sheet material into a vertically dependent, upwardly open tube having overlapping longitudinal edges. These overlapping edges are subsequently sealed together longitudinally by means well known in the art and the end of the tube is sealed together by a pair of transverse or end heat seals which are vertically spaced apart. At this point the tube is filled with a measured quantity of the product to be packaged. A second heat sealing operation, typically performed after the filled tube has been downwardly advanced, completes enclosure of the product. Simultaneously with or shortly after the transverse heat sealing step, the tube is transversely severed by cutting means in a space between the vertically spaced apart pair of transverse heat seals. Thereafter the tube is downwardly advanced and the cycle is successively repeated so as to form a multiplicity of individually packaged products.

Alternatively, a single transverse heat seal including a pair of horizontally spaced apart sealing jaws may be used to form in effect two vertically adjacent heat seals which are simultaneously or subsequently severed at a line vertically intermittently the heat seals.

One particular vertical form-fill-seal arrangement utilizes, in addition to the transverse heat sealing and cutting means, a pair of squeezing rolls situated above the transverse heat sealing means. Such an arrangement is described for example in U.S. Pat. No. 4,506,494 issued to Shimoyama et al. The cutting means is described in this reference as also providing cooling for the just made transverse heat seals to cool and strengthen the seals soon after the sealing step is completed. The cooling-cutting means of this reference is situated a short distance beneath the heat sealing means, such that after the transverse heat sealing step is completed, the pair of squeezing rolls is rotated an increment corresponding to the heat seal width to bring the sealed portion of the tube in horizontal alignment with the cooling-cutting means. The cooling-cutting means is then activated to cool and sever the film in the seal area.

While this arrangement provides for a very satisfactory package, having strengthened heat seals, in some cases it is desirable to implement an alternative packaging arrangement using similar equipment to that described in the Shimoyama et al reference. This alternate method is desirable where for example higher packing speeds are required. In that event, a method somewhat similar to that described in FIGS. 3A-3D of the Shimoyama et al reference is employed. Thus, after transverse sealing, the filled package is drawn downward an entire package length, rather than the small increment preferred in the reference, before the cooling-cutting means is activated.

One problem that arises in the use of this alternate method is the strength of the heat seals immediately after the transverse heat sealing step has been completed. The just formed seal is required to bear the load of the filled package for a full package length of travel before the seal can be further cooled and the package severed. When heated food product for example in a liquid or viscous state is the product packaged in the film, the difficulty in forming a heat seal with adequate strength is further increased.

Various ideas have been proposed in the past for cooling transverse heat seals. For example, U.S. Pat. No. 4,532,753 issued to Kovacs discloses the use of air blown down on the just formed transverse seal to cool it, the air blown down from the vicinity of pinch rolls above the sealing members during initial opening of the sealing members and continuing generally until they reach their fully opened position. The disadvantage of such an arrangement in connection with vertical form fill seal equipment having separate sealing means and cooling-cutting means is that the seal traveling down from the seal area to the cooling-cutting area would actually be moving away from the air cooling apparatus, and the effectiveness of the cooling medium would thereby be reduced. An additional problem with the use of such an arrangement is that the air is being blown across the seal bars in order to reach the seal to be cooled, which is inefficient for proper heating and operation of the sealing means.

British Pat. No. 1,334,616 issued to DeGroot et al discloses an air cooling system in which, at the beginning of withdrawal of a pair of welding jaws, cooling air is blown against the newly formed seals through nozzles located immediately beneath the heating strips of the welding jaws and forming part of the welding component of the apparatus.

Also of interest is U.S. Pat. No. 3,340,129 issued to Grevich disclosing the use of cooling air discharged along apertures in a tube, and directed at the sealed area of a tubular film.

U.S. Pat. No. 4,571,926 issued to Scully discloses means for projecting jets of air downwardly against the front and back sides of a bag suspended in a forming device to assist in releasing the bag from the forming device when it is severed.

It is an object of the present invention to provide means for quickly cooling the transverse heat seals formed on a tubular film in a vertical form fill seal apparatus while the seal pouch is moving downwardly from a sealing means to a cutting means.

It is a further object of the present invention to provide such a cooling means and method for cooling the transverse seals such that the cooling medium contacts the seals in the seal area of the apparatus as well as during the downward movement of the sealed portion of the tubular film toward a cutting means located beneath the sealing means.

SUMMARY OF THE INVENTION

In one aspect of the present invention, an apparatus for intermittently feeding a tubular film material, filling it with a substance to be packaged, and subdividing it into individual packages, comprises a pair of pinch rolls positioned opposite each other in the upper region of the apparatus, and movable perpendicularly toward and away from said tubular film; a pair of heat sealing means positioned opposite each other, spaced from and beneath the pinch rolls and moveable perpendicularly toward and away from the tubular film; a pair of cutting means positioned opposite each other, spaced from and beneath the heat sealing means, and movable perpendicularly toward and away from the tubular film; means for directing a cooling medium onto the heat seal, the means positioned beneath the heat sealing means and above the cutting means; and means for activating the cooling means.

In another aspect of the present invention, a method for cooling the transverse seals of a package formed in a form-fill-seal apparatus, the apparatus having a pair of heat sealing means positioned opposite each other, and a pair of cutting means positioned opposite each other and spaced from and beneath the heat sealing means, comprises directing a cooling medium from a pair of cooling means onto the transverse heat seal as the seal passes from the sealing means to the cutting means.

BRIEF DESCRIPTION OF THE DRAWINGS

Further details are given below with reference to the drawing figures, wherein like reference numerals refer to like parts throughout the same, and wherein:

FIG. 1 is a side view of an apparatus in accordance with the present invention;

FIG. 2 is a side view of the apparatus during a heat sealing and severing step;

FIG. 3 is a side view of the apparatus during initiation of cooling of the just formed transverse seal; and FIG. 4 is a side view of the apparatus during the downward movement of a sealed pouch toward the cutting means.

DESCRIPTION OF THE PREFERRED EMBODIMENT

Referring to FIG. 1 of the drawings, a side view of an apparatus is shown substantially similar that disclosed in U.S. Pat. No. 4,506,494 issued to Shimoyama et al.

FIG. 1 illustrates two formed and sealed pouches 1 and 2 formed from a tubular film 10 typically fed from a roll and over a collar and a forming mandrel (not shown).

Suitable films 10 may be made from a number of mono-layer and multiple layer structures.

The pouches 1 and 2, as depicted in FIG. 1, are being drawn downwardly by the rotation of pinch rolls 12. This downward movement continues until the section of tubular film immediately above pouch 2 is in horizontal alignment with a pair of heat sealing means 14 located on either side of the tubular film and moveable perpendicularly toward and away from the film.

The pinch rolls 12 are moveable perpendicularly toward and away from the tubular film.

At the same time that the section of tubular film 10 above pouch 2 is brought into horizontal alignment with heat sealing means 14, the section of sealed film 16 connecting pouches 1 and 2 is brought into horizontal alignment with a pair of cutting means 18, also moveable perpendicularly toward and away from each other and the sealed film.

Cutting means 18 includes a knife or similar device in one member thereof, shown schematically but not numbered on the right hand side of pouch 1 of FIG. 1 which is brought forward by means well known in the art to sever the seal area 16 by passing through the sealed film and into a recess shown in the left hand member 18 of FIG. 1.

Optionally, cooling means such as that described in the Shimoyama patent referred to above may be incorporated into the cooling-cutting means 18 to further cool the film 10 in the sealed areas between pouches simultaneously with the cutting operation.

FIG. 2 illustrates the arrangement of the invention during the heat sealing of a portion of tubular film above pouch 2, and the substantially simultaneous severing of the tubular film 10 in the seal area 16 connecting pouches 1 and 2. Pouch 1 falls away, preferably onto a conveyer belt or other off loading system, as soon as the pair of cutting means 18 are drawn apart by means well known in the art.

Referring now to FIG. 3, after the transverse sealing step and cutting step have been completed, the pair of pinch rolls 12 initially remain closed, while heat sealing mean 14, and cutting means 18 are drawn apart to permit pouch 1 to fall away. The pair of means 22 mechanically attached to heat sealing means 14 are activated to direct a cooling medium in an arcuate pattern up against the newly formed heat seal 20. The pinch rolls 12 then open, as the just-sealed pouch 2 travels downward. A portion of the cooling medium is directed in an essentially horizontal direction as well. Thus, as shown in FIG. 4, downward movement of the seal 20 caused by downward movement of pouch 2 and further filling of yet to be formed pouch 3 permits the seal 20 to move directly past means 22. This allows a portion of the cooling medium to be projected directly on the heat seal during its downward movement toward cutting means 18. Preferred cooling mediums include but are not limited to air, water, and compressed gas.

Depending on the cooling medium selected, suitable storage, conducting, and delivering means well known in the art may be chosen to supply means 22. Water may be a less desirable cooling medium where the transverse sealing means, or the pouch or pouch seal, would be adversely affected by contact with water.

The present invention thus permits a cooling medium to be directed on the just formed seal 20 during at least a portion of its passage downward to a separate cutting means. Cooling of the heat seal 20 soon after formation of the seal and during the small increment of time associated with its downward movement is advantageous in increasing the transverse seal strength and reducing the likelihood of leakage or total failure of the seal, and therefore the product containing pouch.

As pouch 2 moves downward, and heat seal 20 approaches horizontal alignment with cutting means 18, pinch rolls 12 are brought toward each other to pinch the film together as shown in FIG. 1, and the cycle of FIGS. 1-4 is repeated.

It has been found that, by the practice of the present invention, machine speed and therefore the economic advantage of the vertical form fill seal arrangement of the invention is substantially maintained, while providing strengthened transverse heat seals.

Although the invention has been described with respect to a preferred embodiment, one skilled in the art will appreciate that modifications may be made without departing from the scope of the invention.

What is claimed is:

1. An apparatus for intermittently feeding a tubular film material, filling it with a substance to be packaged, and subdividing it into individual packages, comprising:
   (a) a pair of pinch rolls positioned opposite each other in the upper region of the apparatus, and movable perpendicularly toward and away from said tubular film,
   (b) a pair of heat-sealing means positioned opposite each other, spaced from and beneath said pinch rolls and movable perpendicularly toward and away from said tubular film;
   (c) a pair of cutting means positioned opposite each other, spaced from and beneath said heat-sealing means, and movable perpendicularly toward and away from said tubular film;
   (d) a pair of nozzles connected to, and spaced beneath, respective heat sealing means, and positioned to direct a cooling medium in an arcuate pattern onto the tubular film material;
   (e) means for delivering the cooling medium to the nozzles as a heat seal formed by the heat-sealing means passes downward toward the cooling-cutting means; and
   (f) means for activating the delivering means.

2. The apparatus according to claim 1 wherein the cooling medium is selected from the group consisting of air, water, and compressed gas.

3. A method for cooling the transverse seal of a package formed in a form-fill-seal apparatus, the apparatus having a pair of heat-sealing means positioned opposite each other, and a pair of cutting means positioned opposite each other and spaced from and beneath said heat-sealing means, comprising:
   (a) delivering a cooling medium to a pair of cooling means spaced beneath the respective heat-sealing means; and
   (b) directing the cooling medium in an arcuate pattern from said pair of cooling means onto the transverse heat seal as the seal passes from the sealing means to the cutting means.

4. A method according to claim 3 wherein the cooling medium is selected from the group consisting of air, water, and compressed gas.

* * * * *